United States Patent Office 2,951,369
Patented Sept. 6, 1960

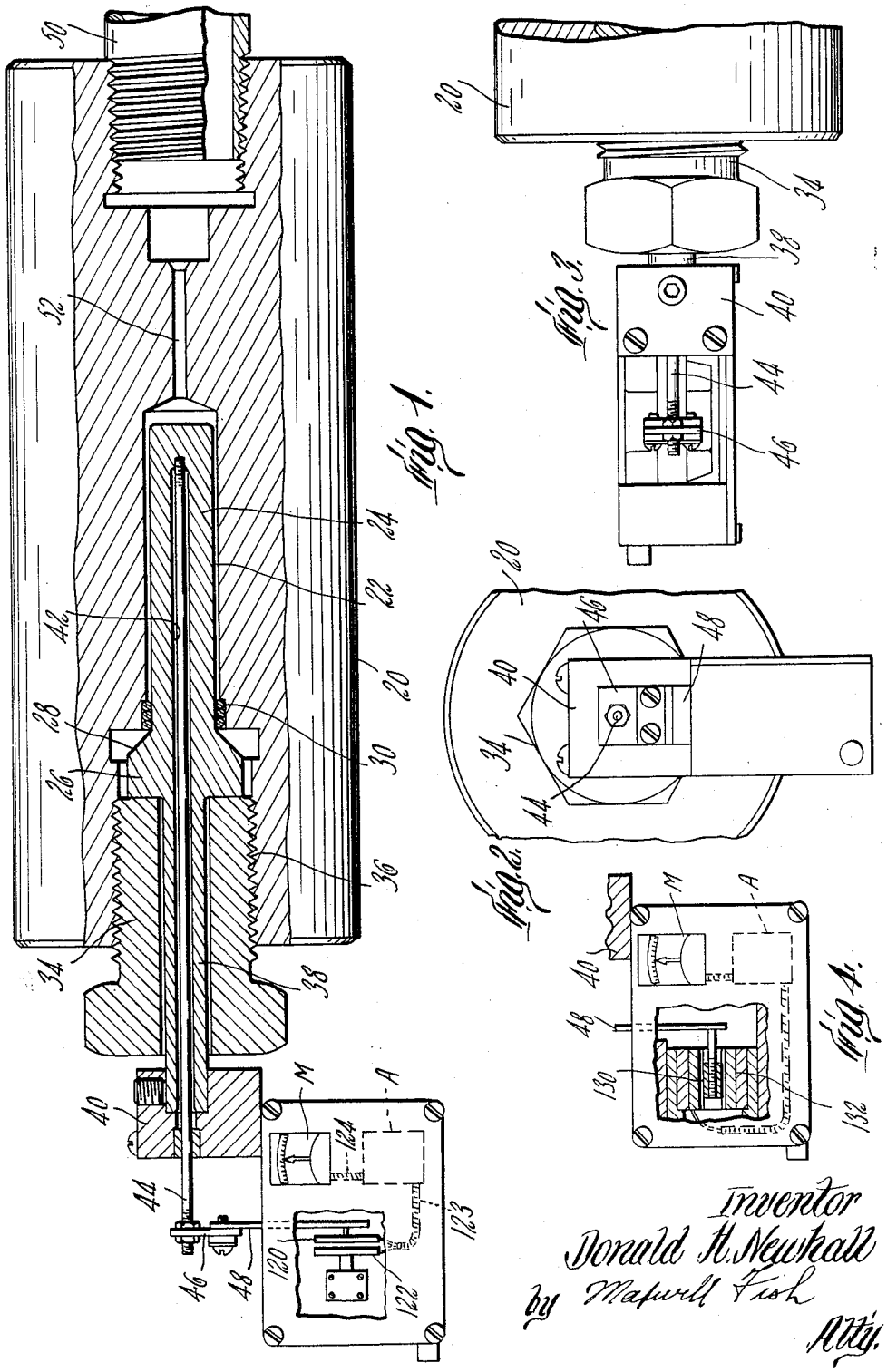

2,951,369
HIGH PRESSURE MEASURING GAGE

Donald H. Newhall, Walpole, Mass., assignor to Harwood Engineering Company, Walpole, Mass., a corporation of Massachusetts Filed Sept. 24, 1958, Ser. No. 763,079
4 Claims. (Cl. 73—388)

The present invention relates to improvements in pressure measuring devices.

It is a principal object of the present invention to provide a device which is well adapted for measuring a very wide range of pressures from zero to 200,000 p.s.i. (pounds per square inch) or more which will have a high degree of accuracy over this entire range of pressures, and more particularly for measurement of very high pressures.

It is a further object of the invention to provide an improved pressure measuring device of this general description which is well adapted for the measuring of transients which comprise pressure changes of very short duration in the order of 0.001 second (milli-seconds) to 0.000001 second (micro-seconds).

The pressure measuring device provided in accordance with the invention consists of a pressure sensing element, all of the external surfaces of which are arranged to be placed simultaneously under compression as, for example, by immersion in a liquid medium under a pressure to be measured, so that changes of said external pressure will cause corresponding changes in the volume of the mass of the sensing member to take place in accordance with the bulk modulus of the sensing element. It will be understood that such compression of the sensing element in accordance with its bulk modulus, in which the mass is subjected to simultaneous external pressures from all sides, is to be distinguished from a pull or push strain applied along one axis of the element only. Measurement of changes in volume of a sensing element under compression in accordance with its bulk modulus permits of the measurement of extremely high pressures for the reason that any possibility of breaking or shearing of the material is eliminated so that very hard and brittle substances having a low rupture point but capable of withstanding such high compressive pressures may be employed. The size of such objects is instantly proportional to the variation of pressure within the elastic limit.

In the illustrated form of the invention, very small changes in volume of the pressure sensitive element are measured by means of a pick-up device, which is responsive to changes in length of the sensing element along one axis, and which is provided with means for registering and for visually indicating such changes. It is contemplated that the pressure sensing element may be constructed of a material, as for example, hardened steel, which is capable of withstanding the extreme pressures for which the gauge is intended and that the change in length of the sensing element may be in the order of 0.005 inch under the influence of pressure changes ranging from zero to 200,000 p.s.i.

The pick-up device employed for detecting small variations in volume of the sensing element may consist in a measuring rod, which is inserted into and is secured against the bottom end of a small hole extending axially of the pressure member, said measuring rod being connected externally of the pressure area with a pick-up device which may, for example, be either electrical or pneumatic and is sensitive to very small changes in position of said measuring rod.

In one form of the device shown, a condenser pressure pick-up is employed which consists of two very thin, exactly parallel discs of steel approaching each other closely, one disc being fixed and the other disc being attached at its center to the outer end of the measuring rod. Variations in the distance between the two discs changes the capacitance in proportion and the signal thus produced is readily transmitted by means of an ultra-high frequency current. The condenser type pick-up above described is so sensitive that a variation between said parallel plates of 0.005 inch (½ thousandth) may be made to cover a pressure range from zero to 100,000 p.s.i. accurately.

In another form of the device shown, an automatic form of pick-up is provided which takes the form of an armature extending through two oppositely wound coils and secured to move with the pressure rod. Movement of the core with the pressure rod varies the inductance of the circuit proportionately.

With the above and other objects in view as may hereinafter appear, several features of the invention consist also in the devices, combinations and arrangements of parts hereinafter described and claimed, which, together with the advantages to be obtained thereby, will be readily understood by one skilled in the art from the following description taken in connection with the accompanying drawings, in which:

Fig. 1 is a sectional view of a pressure gage illustrating one form of the invention in which a pressure sensing element is mounted within a casing which provides a pressure chamber within which the sensing element is subjected to the pressure of the medium to be measured, in combination with a measuring rod and electrical pick-up device for measuring the amount of volume change of said sensing member along one axis in accordance with its bulk modulus;

Fig. 2 is an end view of the pressure gage shown in Fig. 1 looking from the left end of Fig. 1;

Fig. 3 is a detail plan view of the measuring rod and electrical pick-up connections shown in Fig. 1; and Fig. 4 is a diagrammatic view illustrating an alternative form of electrical pick-up connected with the measuring rod of Fig. 1.

Referring to the drawings, the pressure gauge illustrated in Figs. 1–3, inclusive, comprises a cylindrical casing 20 having in the central portion thereof a bore 22 which provides a pressure chamber to receive a cylindrically shaped sensing member 24. The sensing member 24 is formed intermediate its length with a flange 26 having a tapered face 28 which is adapted to be held under pressure against a series of pressure sealing rings 30 to seal off the portion of the sensing member 24 to the right of the flange which is contained within the pressure chamber 22. The flange 26 of the sensing number is in turn engaged by a hollow locking nut 34, screw threaded into a tap 36 formed in the left hand end of the casing 20. It will be noted that the sensing member 24 has a leftward extension 38 which extends loosely through the nut 34, and at its outer end has secured thereto a bracket 40 to receive the bracket from which is mounted the electrical pick-up associated with the gauge. The sensing member 24 is formed throughout the greater portion of its length with a central bore 42 within which is loosely mounted a measuring rod 44. The rod 44 at its inner or right hand end, as viewed in Fig. 1, is screw threaded into the sensing member 24 at the base of the aperture or bore 42, and at its left hand end is connected by means of a link 46 with an actuating arm 48 of an electrical pick-up device hereinafter to be more fully described.

It will be understood that in assembling the device, the nut 34 is tightened down until a perfect seal is formed by the sealing rings 30 between the sensing member and the cylindrical casing, thus closing the left hand end of the pressure chamber 22. The right hand end of the casing 20, as shown in Fig. 1, has been provided with a pressure fitting 50 through which the medium under pressure to be measured is admitted, thence passing through a small bore 52 formed axially in the casing 20 to the right hand end of pressure chamber 22.

The gauge illustrated in Figs. 1, 2 and 3 of the drawings is particularly adapted for the measurement of very high pressures. To this end the sensing member 24 is entirely immersed in the fluid at the pressure to be measured and is thus placed under hydrostatic pressure, which is applied volumetrically producing the same stresses on all sides. The hydrostatic compression of the sensing member in accordance with its bulk modulus has the advantage that the sensing element cannot fail either by shear or by plastic flow. In other words there is no rupture point of the sensing member even where this member is composed of the most hard and brittle of substances. In the present instance it is contemplated that the sensing member will be of hardened steel, and the ratio of diameter to length of the sensing unit is calculated to produce a deformation of the sensing element lengthwise in the amount of 0.005 inch for each 100,000 pounds per square inch of pressure. The small deformation thus provided which encompasses a short length only of the stress-strain curve of the material used, namely hardened steel, has been found to show a substantially perfect ratio of deformation to pressure. The fact that the stress applied is well within the elastic limit provides freedom from aberation or hyteresis, so that the reaction and recovery will be for all intents and purposes instantaneous permitting accurate measurement of very short pressure changes known as transients. While high grade steel has been stated as a preferred medium for the sensing element, it will be understood that chromium, beryl, nickel, and cobalt and their similar alloys may also be used for the measurement of pressures up to in the order of 250,000 pounds per square inch. For extreme pressures ranging from 300,000 to 600,000 pounds per square inch alloys of tungsten, molybdum, rhodium, ruthenium, iridium or osmium could be used.

In the preferred form of the invention shown in the drawing, an electrical pick-up and amplifying system is employed which acts reliably and instantaneously to register the minute changes in volume expressed in terms of variations in the length of the sensing member produced by changes in the external pressure to be measured. Referring to Fig. 1, and to Fig. 3 which is a detail plan view of the electrical pick-up device, actuating arm 48 is connected to one of the two opposed steel plates 120, 122 of a condenser, said plates being mounted very close together and arranged for movement relative to one another within a very small range. Movement of one plate relative to the other serves to produce a change in the stored static electricity, which change is noted and amplified by any well-known means, as for example, by means of an amplifier system housed in a box A connected with the condenser plates by means of a cable 123, amplifier A being connected by means of a cable 124 with a visual meter M.

An alternative form of electrical pick-up and amplifying device may be utilized in the form of a pressure induction coil more specifically illustrated in connection with Fig. 4 comprising an armature 130 connected, as here shown, to the arm 48 for movement relative to two stationary coils generally indicated at 132. The induction coil is connected by suitable wiring with an amplifier system A and a visual inspection meter B. Inasmuch as the amplifying and visual inspection units form no part specifically of the present invention and are readily available in commercial form, no particular description thereof is included herewith.

The pick-up device generally indicated at 120 in Fig. 4 takes the form of a pressure induction coil consisting of a double wound field coil and an armature movable relatively thereto.

Movement of the armature from neutral increases the voltage in one coil and decreases the voltage in the other coil. It will be noted that the condenser type pick-up and also the double induction coil type of pick-up each provide an electrical pick-up device in which there are no overruns or underruns, in which hysteresis is absent, and in which there is no wandering of the zero point. These devices are extremely accurate to within limits of 0.1 percent or even closed. The signal produced is extremely rapid and follows exactly pressure changes reflected in variations in the length of the sensing element.

The invention having been described what is claimed is:

1. In a pressure measuring device, the combination of a pressure sensing element comprising a metallic block having a supported surface and having all the other external surfaces thereof arranged to be placed simultaneously under compression by immersion in a liquid medium under a hydrostatic pressure to be measured so that changes of said externally applied pressure will cause corresponding changes in the volume of the mass of the metallic block to take place in accordance with the bulk modulus of the metallic block, and a pick-up device comprising means responsive to changes in an axial dimension of said metallic block as an indication of the change in the volume of the mass of said metallic block, and means for registering and for indicating such changes.

2. In a pressure measuring device, the combination of a pressure sensing element comprising a metallic block having a supported surface and having all the other external surfaces thereof arranged to be placed simultaneously under compression by immersion in a liquid medium under a hydrostatic pressure to be measured so that changes of said externally applied pressure will cause corresponding changes in the volume of the mass of the metallic block to take place in accordance with the bulk modulus of the metallic block, and said metallic block being constructed and proportioned to be deformed in accordance with said bulk modulus by the compressive action of said medium under said hydrostatic pressure including a deformation along an axis extending from said supported surface in accordance with said bulk modulus, said metallic block having a small aperture extending from said supported surface of the block along said axis, a measuring rod loosely supported within and projecting from said aperture and secured to said metallic block at the inner end of the aperture, and a highly sensitive pick-up means connected with the projecting end of said measuring rod comprising a device connected with said measuring rod to register any change of position of the measuring rod relative to the outer surface of said metallic block, and an indicating device connected with said registering device.

3. A pressure measuring device according to claim 2 in which the pick-up device comprises a condenser including relatively stationary condenser plate, a second condenser plate supported adjacent thereto and connected to move with the projecting end of said measuring rod, and electrical means for registering and indicating relative movement of said plates.

4. A pressure measuring device according to claim 2 in which the pick-up device comprises a coil type induction coil having a movable part connected to move with the projecting end of said measuring rod, and means for registering and for indicating any change of position of said movable part and measuring rod relative to the supported face of said element.

References Cited in the file of this patent

UNITED STATES PATENTS

| 1,468,383 | Guy | Sept. 18, 1923 |
| 2,659,390 | MacLea et al. | Nov. 17, 1953 |

FOREIGN PATENTS

| 846,870 | France | June 19, 1939 |